US010425992B2

(12) United States Patent
Birman et al.

(10) Patent No.: US 10,425,992 B2
(45) Date of Patent: Sep. 24, 2019

(54) CONNECTOR FOR A FLUID LINE

(71) Applicant: NORMA GERMANY GMBH, Maintal (DE)

(72) Inventors: Ervin Birman, Subotica (RS); Stephan Mann, Biebergemuend (DE)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 14/579,322

(22) Filed: Dec. 22, 2014

(65) Prior Publication Data

US 2015/0245414 A1 Aug. 27, 2015

(30) Foreign Application Priority Data

Feb. 24, 2014 (DE) .......................... 10 2014 102 362

(51) Int. Cl.
*H05B 3/06* (2006.01)
*H05B 1/02* (2006.01)
(Continued)

(52) U.S. Cl.
CPC ................ *H05B 3/06* (2013.01); *F16L 53/38* (2018.01); *H05B 1/0297* (2013.01);
(Continued)

(58) Field of Classification Search
CPC ....... H05B 3/06; H05B 1/0297; F16L 53/008; F16L 25/01; F16L 53/004; F16L 53/38;
(Continued)

(56) References Cited

U.S. PATENT DOCUMENTS 6,520,800 B1 * 2/2003 Michelbach ......... H01R 4/4818
439/440
8,238,733 B2 * 8/2012 Sawada ................. F16L 53/008
138/33
(Continued)

FOREIGN PATENT DOCUMENTS

DE 202007018086 6/2009
DE 10 2011 102 154 11/2012
(Continued)

OTHER PUBLICATIONS

Office action issued in Korea counterpart application No. 10-2015-0018843, dated Apr. 7, 2016, with an English language translation of the Office action.
(Continued)

*Primary Examiner* — Dana Ross
*Assistant Examiner* — Joe E Mills, Jr.
(74) *Attorney, Agent, or Firm* — Greenblum & Bernstein, P.L.C.

(57) ABSTRACT

A connector for a fluid line having a housing that includes a connecting piece that can be connected to a tube, as well as a connection geometry that can be connected to a mating element. The housing includes an outlet opening arranged in an outlet section through which opening a heating device is guided out of the housing to the outside, wherein the heating device is guided through a plug that is arranged in the outlet opening, and the outlet section is provided with an injection molding compound covering the outlet opening. The connector is provided that a separating element arranged between the injection molding compound and the plug.

13 Claims, 1 Drawing Sheet

(51) Int. Cl.
*F16L 53/38* (2018.01)
*F16L 25/01* (2006.01)

(52) U.S. Cl.
CPC ...... *F01N 2610/10* (2013.01); *F01N 2610/14* (2013.01); *F16L 25/01* (2013.01)

(58) Field of Classification Search
CPC .. F01N 2610/10; F01N 2610/14; B29C 45/14
USPC .................................. 219/541; 392/320, 321
See application file for complete search history.

(56) References Cited

U.S. PATENT DOCUMENTS

| | | | | |
|---|---|---|---|---|
| 8,925,573 | B2 * | 1/2015 | Borgmeier | F16L 25/01 137/341 |
| D724,703 | S * | 3/2015 | Downs | D23/262 |
| 2004/0074554 | A1 * | 4/2004 | Starita | B29C 44/0492 138/137 |
| 2008/0193774 | A1 * | 8/2008 | Stone | A43B 7/1425 428/423.1 |
| 2008/0197314 | A1 * | 8/2008 | Bohlmann | F02M 61/168 251/366 |
| 2009/0128266 | A1 * | 5/2009 | Kramer | H01H 50/023 335/202 |
| 2010/0118553 | A1 * | 5/2010 | Payne | H01J 5/48 362/377 |
| 2010/0206415 | A1 * | 8/2010 | Ellis | F16L 53/007 138/33 |
| 2010/0291394 | A1 * | 11/2010 | Klett | B29C 45/14311 428/458 |
| 2011/0025043 | A1 * | 2/2011 | Garnier | F16L 53/005 285/41 |
| 2012/0291880 | A1 * | 11/2012 | Eckardt | F16L 53/008 137/341 |
| 2012/0291905 | A1 * | 11/2012 | Eckardt | F16L 53/008 138/109 |
| 2013/0056500 | A1 * | 3/2013 | Neuhaus | B05B 11/007 222/402.13 |
| 2013/0276430 | A1 * | 10/2013 | Ulrich | F01N 3/2066 60/274 |
| 2016/0262561 | A1 * | 9/2016 | Pearce | A47G 27/0212 |

FOREIGN PATENT DOCUMENTS

| | | |
|---|---|---|
| DE | 102011102154 | 11/2012 |
| EP | 1070642 | 1/2001 |
| JP | 2009-030771 | 2/2009 |
| JP | 2010-535313 | 11/2010 |
| JP | 2011-506889 | 3/2011 |
| JP | 2012-241902 | 12/2012 |
| JP | 2012-247059 | 12/2012 |
| KR | 10-2012-0130047 | 11/2012 |
| KR | 10-2012-0130049 | 11/2012 |
| RU | 55082 | 7/2006 |
| RU | 2300043 | 5/2007 |
| SU | 1571352 | 6/1990 |
| WO | 2009/124910 | 10/2009 |

OTHER PUBLICATIONS

European Search Report for Application No. 14199763.5 dated Jul. 3, 2015 with English Translation thereof.

Russian Office Action issued in Patent Appl. No. 2014153267/06(085119), dated Jan. 14, 2016, along with an English language translation thereof.

Official Notice of Rejection of the Japanese Patent Office, dated Dec. 1, 2015 from Japanese Application No. 2015-023197.

English language translation of Official Notice of Rejection from Japanese Application No. 2015-023197.

* cited by examiner

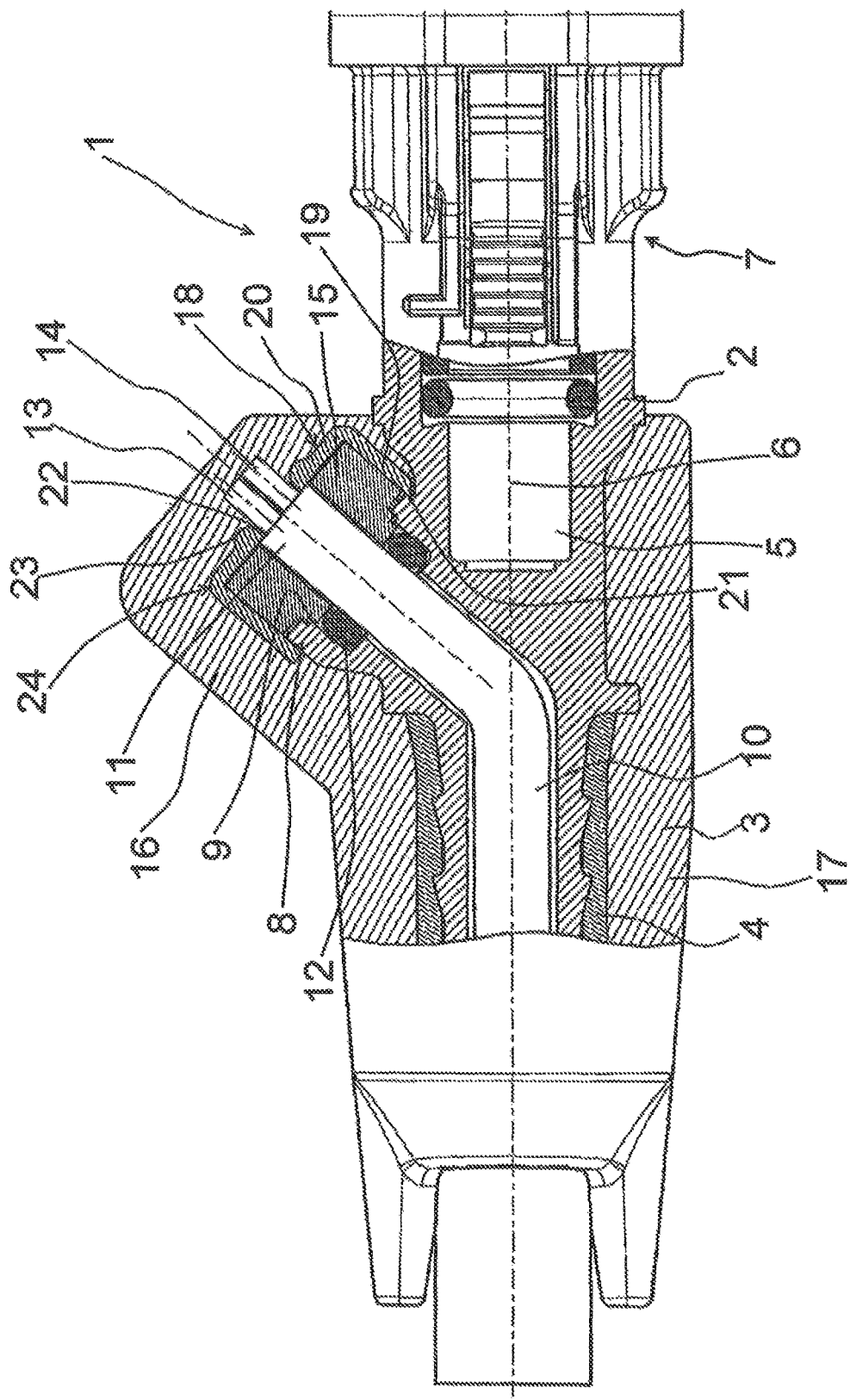

CONNECTOR FOR A FLUID LINE

CROSS-REFERENCE TO RELATED APPLICATIONS

The present application claims priority under 35 U.S.C. § 119(a) of German Patent Application No. 10 2014 102 362.5 filed Feb. 24, 2014, the disclosure of which is expressly incorporated by reference herein in its entirety.

BACKGROUND

The invention relates to a connector for a fluid line having a housing which comprises a connecting piece that can be connected to a tube and a connection geometry that can be connected to a mating element, wherein the housing comprises an outlet opening arranged in an outlet section, through Which opening a heating device is guided out of the housing to the outside, wherein the heating device is guided through a plug which is arranged in the outlet opening and the outlet section is provided with an injection molding compound covering the outlet opening.

A connector of this type is known from DE 10 2011 102 154 A1, for example.

SUMMARY

The invention is described below in connection with a fluid line through Which urea can be transported from a supply to a point of use. Urea is used in diesel engines in order to reduce nitrogen oxides.

Urea freezes at a temperature of −11° C. and is then no longer fluid. For environmental protection reasons, however, urea must be available for a predetermined amount of time after the starting of a diesel engine even at low temperatures. It is therefore known to heat the fluid line. The heating should thereby also include the connector.

If the heating device is arranged inside the line, that is, within the volume of the tube, the heating device, or at least the connector thereof must be guided out of the fluid line at some point in order to be able to supply electric energy. Expediently, this occurs in a connector.

The point where the heating device, or parts thereof, exit(s) out of the connector must be sealed. In the known case, the plug is used for this purpose. This plug can be secured in the housing by the injection molding compound. However, when the injection molding compound is applied, the problem occurs that the injection molding compound can also penetrate past the plug and thus reach regions of the connection in which it is not desired.

The object of the invention is to produce a connector with little effort.

This object is attained for a connector of the type named at the outset in that a separating element is arranged between the injection molding compound and the plug.

During the application of the injection molding compound, this separating element acts as a harrier, as it were, which prevents a penetration of the injection molding compound into the interior of the housing even at higher pressures. The application of the injection molding compound can therefore be limited to the regions in which the injection molding compound is desired.

Here, it is preferred that the separating element covers a gap between the plug and the housing. The penetration of the injection molding compound into the gap is thus reliably prevented.

Preferably, the separating element is fused to the injection molding compound. To apply the injection molding compound, the connector is inserted into a corresponding mold and the injection molding compound is then injected into the mold at an increased temperature and with increased pressure. The separating element can be formed from a material that begins to melt at the temperature at which the injection molding compound is injected into the mold, so that the injection molding compound and the separating element can be fused to one another without additional effort. The separating element is thus fixed in the initially assumed position after the conclusion of the injection molding process.

Here it is preferred that the separating element has a thickness which is large enough that the separating element does not completely fuse when the injection molding compound is applied. When introduced into the injection mold, the injection molding compound has a relatively high temperature. However, it begins to cool as soon as it has been introduced into the injection mold. It thereby also emits heat to the separating element, whereby the separating element fuses, at least at the point of contact between the injection mold compound and the separating element. If the separating element is selected such that it is thick enough, however, then the cooling of the injection molding has progressed far enough before the separating element has fully melted. It is thus prevented that parts of the separating element penetrate into the interior of the housing, where they are not desired. The separating element thus still forms a barrier against a penetration of the injection molding compound into the interior of the housing.

Preferably, the separating element is formed from the same material as the injection molding compound. In this manner, the coordination of the temperatures of the injection molding compound and the separating element is relatively simple.

Preferably, the plug holds a seal in the housing, which seal surrounds the heating device. This seal can, for example, be embodied as an O-ring. A seal of this type is relatively sensitive when injection molding compound is applied to it. Through the use of a separating element, the penetration of injection molding compound to the seal is reliably prevented. The seal can then be used to perform a sealing function, and the plug can be used to achieve the retaining function for the seal.

Preferably, the heating device is embodied as a heating rod which ends inside the separating element, wherein at least one electric connection line of the heating rod is led out of the heating rod and through the separating element. The electric connection line has a significantly smaller diameter, or cross-sectional size, than that of the heating rod. Thus, only a smaller opening in the separating element is also necessary in order to feed the electric connection line through. Even if two electric connection lines of the heating rod need to be led through the separating element, the cross-sectional size of an opening necessary therefor is smaller than the cross-sectional size of the opening for the entire heating rod. The smaller the corresponding opening, the lower the risk of the injection molding compound passing through the opening. If the separating element is fused by the injection molding compound, then the risk is already lower. Once the separating element is fused, the molten material of the separating element can be moved into the corresponding opening by means of the high pressure prevailing during the injection molding and can solidify there.

Preferably, the separating element projects past the outlet opening and comprises on its projecting section a rounded or chamfered edge. An embodiment of this type is particularly advantageous when electric connection lines of the heating rod or of another heating device are led over the separating element. Because of the rounded or chamfered edge, the risk of the electric connection line being damaged by a sharp-edged border of the separating element is relatively low.

It is also an advantage if the separating element comprises an angled side surrounding at least a part of its circumference, wherein the outlet section comprises a neck in which the outlet opening is arranged and the side covers the neck at its circumference. The separating element is thus embodied in the form of a cap or an inverse cup. The protection against a penetration of the injection molding compound into the interior of the housing is thus once again increased.

BRIEF DESCRIPTION OF THE DRAWINGS

The invention is described below on the basis of a preferred exemplary embodiment in connection with the drawing. Wherein the single FIGURE shows a schematic longitudinal section through a connector.

DETAILED DESCRIPTION

A connector 1 for a fluid line comprises a housing 2 with a connecting piece 3. A tube 4 is slid onto the connecting piece 3. The connecting piece 3 has a "fir tree structure."

A pass-through channel 5 with a longitudinal axis 6 runs through the connecting piece 3. At the end of the housing 2 opposite of the connecting piece 3, a connection geometry 7 is provided with which the connector 1 can be connected to a mating element not illustrated in greater detail, for example, the connecting piece of a tank.

The housing 2 comprises an outlet neck 8 which surrounds an outlet opening 9.

A heating device in the form of a heating rod 10 is arranged in the pass-through channel 5. The heating rod 10 comprises an angled section 11 which encloses an angle with the longitudinal axis 6. The section 11 projects into the outlet neck 8.

A seal 12, for example, an O-ring, surrounds the section 11 of the heating rod 10 and creates a seal between the heating rod 10 and the housing 2.

Two electric connection lines 13, 14 are led out of the heating rod 10, via which lines the electric energy can be supplied in order to bring the heating rod to an increased temperature. The heating rod 10, which apart from this also extends into the tube 4, is thus capable of heating a fluid, for example, an aqueous urea solution, that is located in the tube 4 and in the connector 1.

A plug 15 is arranged in the outlet neck 8 and surrounds the section 11 of the heating rod 10. The plug 15 is used to hold the seal 12 in its position. The plug 15 projects out of the outlet opening 9.

An injection molding compound 16 covers the outlet neck 8 and its more proximal surrounding area, which is referred to below as the "outlet section." The injection molding compound 16 also comprises a section 17 which is located on the side of the housing 2 opposite of the outlet neck 8. The plug 15 is thus held in the housing 2 by a positive fit.

A separating element 18 is arranged between the injection molding compound 16 and the plug. The separating element 18 comprises a side 19 that is angled relative to a base 20 of the separating element 18. The side 19 does not need to run across the entire circumference of the separating element 18. This is, however, the case in the present exemplary embodiment. Accordingly, the side 19 surrounds the outlet neck 8 at the circumference thereof over a small axial length. The separating element 18 thus covers the plug 15 and a gap 21 between the plug 15 and the housing 2, expressed more accurately, the outlet neck 8.

The separating element 18 comprises an opening 22, through which the electric connection lines 13, 14 are led. As can been seen in the drawing FIGURE, the heating rod 10 has an end that is flush with the plug 15 inside the separating element 18. The separating element 18 thus sits on a front face of the section 11 of the heating rod 10.

The separating element 18, which, as explained above, is embodied as a cap or cup, comprises a rounded or chamfered edge 24, over which the electric connection lines 13, 14 can be led. This is not visible in the drawing, since the electric connection lines 13, 14 run outside the drawing plane. As a result of the round or chamfered shape of the edge 24, the danger of the electric connection lines 13, 14 being damaged by a sharp edge is virtually no longer present.

The opening 22 is surrounded by a circumferential rounded beading 23 so that a sharp edge and thus the risk of damage to the electric connection lines 13, 14 can also be avoided here.

The separating element 18 is formed from the same material as the injection molding compound 16. However, this is not absolutely necessary. The material of the separating element 18 should, however, be matched with the material of the injection molding compound 16 such that it begins to melt during the application of the injection molding compound 16 or is at least softened enough so that the separating element 18 is fused to the injection molding compound 16.

However, the separating element 18 has a thickness which is large enough that the separating element 18 does not completely fuse when the injection molding compound 16 is applied. There thus still remains a "protective plate" between the injection molding compound 16 and the plug 15, so that it can be reliably prevented that injection molding compound 16 enters into the interior of the housing 2.

For the production of the connector 1, the heating rod 10 is inserted in such a manner that its section 11 protrudes into the outlet neck 8. The seal 12 and the plug 15 are slid onto the section 11. If it has not yet occurred, the electric connection lines 13, 14 are uncovered. The separating element 18 is subsequently fitted onto the connection neck 8, wherein the electric connection lines 13, 14 have been led through the opening 22. This unit of the housing 2, heating rod 11, seal 12, plug 15 and separating element 18 is then positioned in an injection mold, and the injection molding compound 16 is injected into the injection mold at an increased temperature and under increased pressure. As soon as the injection molding compound 16 has reached the injection mold, it cools. In the regions where it contacts the separating element 18, however, the separating element 18 begins to melt so that the injection molding compound 16 is fused to the separating element 18. Since the injection molding compound 16 must emit heat to the separating element 18 in this process, the temperature decreases and it is prevented that the separating element 18 completely fuses. It is thus prevented that the injection molding compound 16 enters into the interior of the housing 2.

The invention claimed is:

1. A connector for a fluid line comprising:
   a housing having an outlet opening arranged in an outlet section;
   a plug projecting out of the outlet opening;

a connecting piece configured to be connected to a tube;

a connection geometry configured to be connected to a mating element;

a heating device comprising a heating rod guided through the plug and the outlet opening to an outside of the housing;

at least one electrical connection line connected to the heating rod;

the outlet section being provided with an injection molding compound covering the outlet opening; and a separating element being in the form of a cap or an inverse cup arranged between the injection molding compound and the plug, the separating element covering the plug and a gap between the plug and the housing and radially encloses the plug;

the heating rod not extending through the separating element and having an end positioned within the separating element;

the at least one connection line extending from the end of the heating rod and through an opening of the separating element; and the opening being surrounded by a circumferential rounded beading.

2. The connector according to claim 1, wherein:
the separating element is fused to the injection molding compound.

3. The connector according to claim 2, wherein:
the separating element has a thickness capable of not completely fusing when the injection molding compound is applied.

4. The connector according to claim 1, wherein:
the separating element is formed from the same material as the injection molding compound.

5. The connector according to claim 1, further comprising:
a seal in a position within the housing, surrounding the heating device; and
wherein the plug holds the seal in the position in the housing.

6. The connector according to claim 1, wherein:
the separating element has a projecting section projecting past the outlet opening; and
in the projecting section, the separating element has a rounded or chamfered edge.

7. The connector according to claim 1, wherein:
the separating element has an angled side surrounding at least a part of a circumference of the separating element;
the outlet section comprises an outlet neck, the outlet opening being arranged in the outlet neck; and
the angled side of the separating element covers the outlet neck at the circumference of the separating element.

8. The connector according to claim 1, wherein:
the separating element being formed from a material matched to a material of the injection molding compound such that the material of the separating element is configured to begin to melt at an injection temperature of the injection molding compound.

9. The connector according to claim 1, wherein:
the end of the heating rod is flush with a surface of the plug.

10. The connector according to claim 1, wherein:
the separating element includes an opening and the at least one connection line extends through and beyond the opening;
the opening has a cross-sectional size smaller than a cross-sectional size of the heating rod to prevent the heating rod from passing through the opening.

11. The connector according to claim 1, wherein:
the rounded beading surrounds the at least one line that extends from the end of the heating rod.

12. The connector according to claim 1, wherein:
the gap between the plug and the housing is a gap between the outlet neck and the plug.

13. The connector according to claim 1, wherein:
the gap between the plug and the housing is an axial gap between the outlet neck and the plug.

\* \* \* \* \*